Oct. 6, 1970 — G. E. GARCIA — 3,533,063
LOW PRESSURE PNEUMATIC TIRE TRANSMITTER
Filed Dec. 9, 1966

George E. Garcia
INVENTOR.

BY *Lee R Larkin*

ATTORNEY

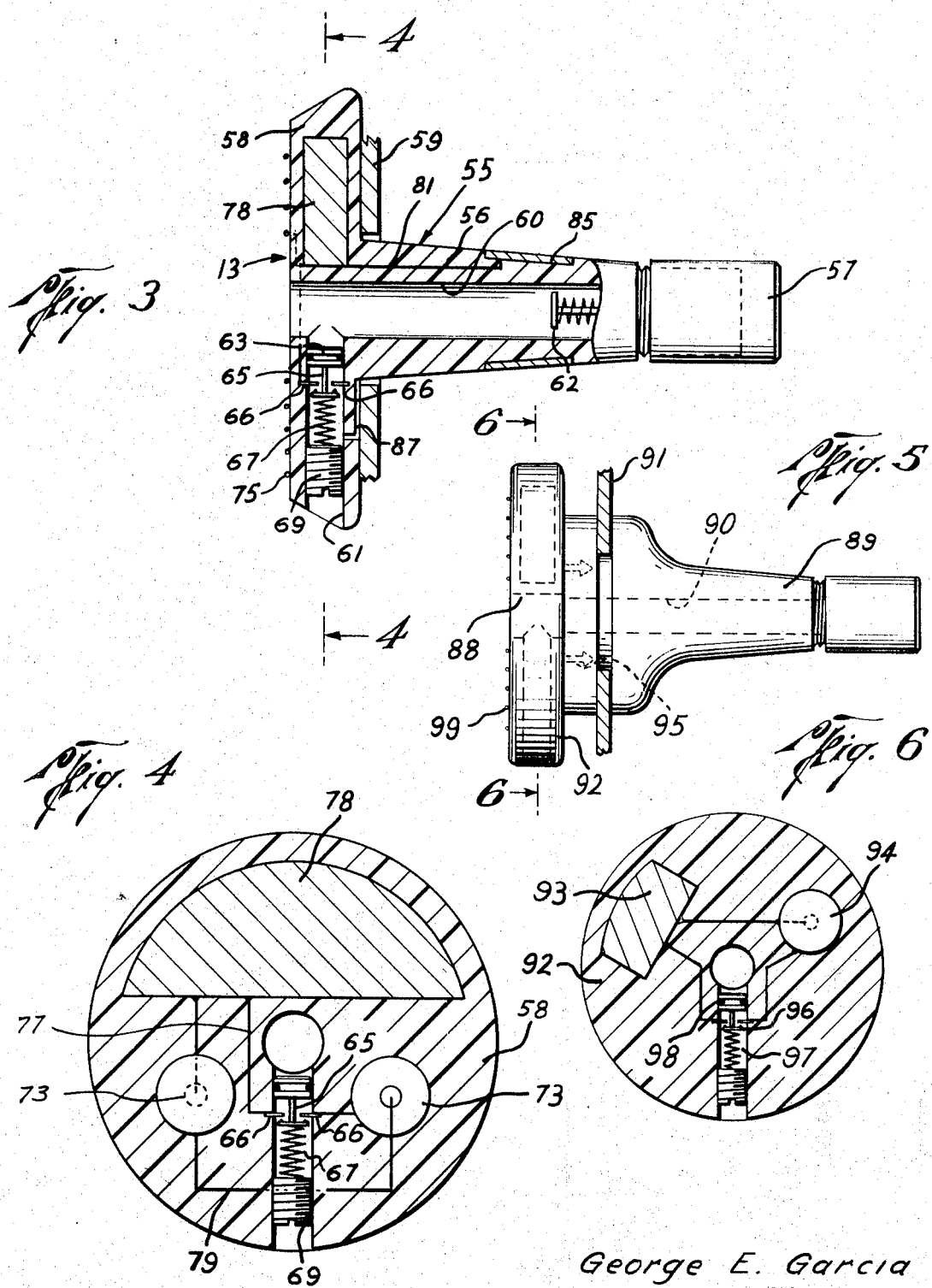

United States Patent Office 3,533,063
Patented Oct. 6, 1970

3,533,063
LOW PRESSURE PNEUMATIC TIRE
TRANSMITTER
George E. Garcia, Houston, Tex.
(2370 Broadway St., San Francisco, Calif. 94115)
Filed Dec. 9, 1966, Ser. No. 600,515
Int. Cl. B60c 23/02
U.S. Cl. 340—58                    4 Claims

ABSTRACT OF THE DISCLOSURE

This invention relates to a low pressure pneumatic tire transmitter including a radio transmitter which is adapted to produce radio signals in response to a decrease in tire pressure below a predetermined level. It includes a body member which is associated with the valve stem of the tire, with the radio transmitter mounted in the body member. Pneumatic switch means are provided having port means communicating with the interior of the tire, with the switch means being responsive to a decline in tire pressure to thereby activate the radio transmitter. A receiving set is also provided for receiving the transmitted signals as an indication of a low tire.

---

This invention relates to a low pressure pneumatic tire transmitter. More particularly, this invention relates to a novel radio transmitter which is adapted to produce radio signals in response to a decrease in tire pressure below a predetermined level.

Pneumatic tires on vehicles such as cars and trucks often become under inflated or deflated without the vehicle operator becoming aware of this dangerous condition. When this happens, the low or deflated tire tends to heat up and may eventually disintegrate or be damaged beyond repair. In any event, driving with a deflated or under inflated tire can create dangerous driving conditions, as well as cause physical damage to the tire and vehicle.

Many prior art devices have been developed in an attempt to provide a solution to this problem, but none have been entirely satisfactory. It is desirable that such a device be economical in construction, simple of construction and operation, relatively free of malfunctioning even when submitted to great vibration, simple to adjust to be responsive to the desired pressure level in the tire, and have simple antenna means and related parts which will not interfere with or obstruct the normal operation of a valve stem through which the pressure may be applied to or relieved from the tire, and which will work automatically in response to a decrease in tire pressure below a predetermined level.

It is, therefore, an object of this invention to provide an improved low pressure pneumatic vehicle tire transmitter which will overcome the aforesaid shortcomings of the prior art and provide a solution to the problems enumerated above.

Briefly stated, this invention relates to a low pressure pneumatic tire transmitter which comprises a body member which is associated with the valve stem of the aforesaid pneumatic tire, which may be mounted on a vehicle, for example. Radio transmitting means are mounted in this body member. In addition, a transmitting antenna is mounted about the valve stem of the tire and is connected to the transmitting means. Pneumatic switch means are provided having port means communicating with the interior of the tire and responsive to a decline in tire pressure below a predetermined level for actuating the transmitting means.

The foregoing apparatus is designed to be used with a receiving set which may be mounted in the cab of a vehicle and provided with receiving antennas located in the wheel well of each of the pneumatic tires, such that a driver may be made aware of a radio signal transmitted by one of the transmitters located on a tire which is low in pressure; and the warning means of the receiver may be either a light or bell arrangement, or the like.

Reference to the drawings will further explain the invention wherein like numerals refer to like parts and in which:

FIG. 3 is a generally central sectional view of another embodiment of the invention, showing the transmitter incorporated in the valve stem itself, which valve stem might be utilized in connection with a tubeless-type tire.

FIG. 4 is a sectional view taken generally at line 4—4 of FIG. 3.

FIG. 5 is a side elevation view of an alternate embodiment of the invention which is adaptable for attachment to a valve stem utilized in tubeless type tires.

FIG. 6 is a sectional view taken at line 6—6 of FIG. 5.

Figures 1, 2:
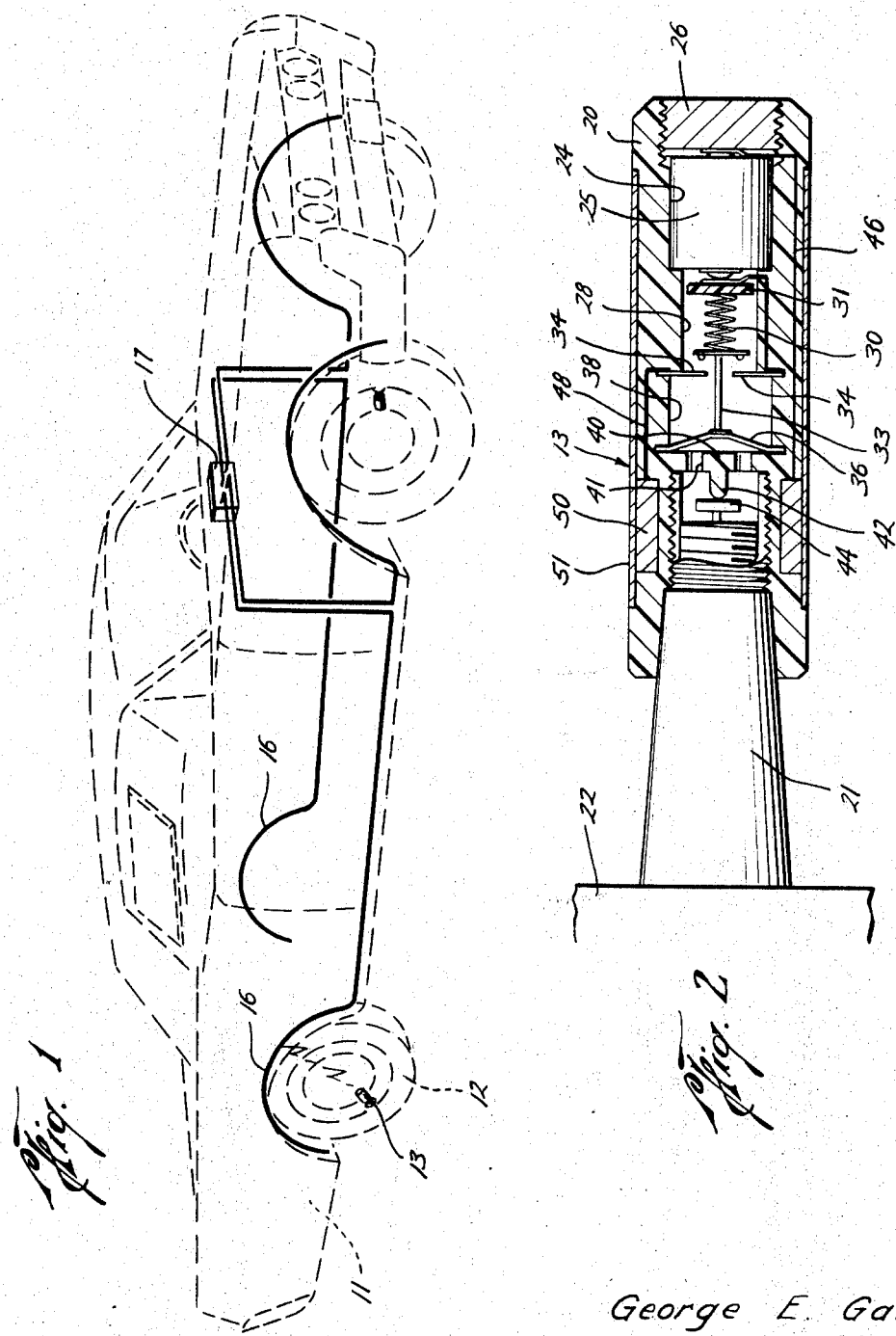
FIG. 1 is a prospective view of a typical receiving system with which the transmitter of this invention is adapted to be operated.
FIG. 2 is a generally central sectional view of one embodiment of the transmitter of this invention shown as it might be mounted on the end of a typical valve stem.

Referring now to FIG. 1, a vehicle in the form of car 11 is shown having pneumatic tires 12 mounted thereon. Each of the tires may have mounted on the valve stems thereof a transmitter 13 which may be of the type shown in FIG. 2, for example.

Receiving antennas 16 are mounted in each of the wheel wells and connected by appropriate leads to a receiver set 17 mounted on or attached to the dashboard of vehicle 11. It is to be understood that receiver set 17 can be of standard construction and include amplifying means to amplify the signals picked up by antennas 16 and means for indicating the occurrence of such transmission, in the form of a buzzer, a bell, a light, or the like. It is to be further understood that receiver set 17 may be demountable from the dashboard for convenience in handling and operating.

Referring now to FIG. 2, one embodiment of the invention is described in greater detail. This embodiment includes a generally cylindrical body member 20 preferably of hardened rubber having a threaded portion for threading on the upper end of valve stem 21 of a pneumatic tire, which valve stem protrudes through tire rim 22, for example.

Body member 20 is provided with port means which communicate with the interior of the tire and is in the general form of an axial bore therethrough, including upper chamber 24 in which is mounted power source in the form of a three volt battery 25 held in position by body plug 26 threadably received in the end of body member 20. The axial bore also includes intermediate chamber 28 in which is mounted spring biasing means in the form of compression spring 30 which may be of a pre-selected strength so as to resist a predetermined force, and is supported on the right end thereof, as shown in FIG. 2 by insulator 31 and connected at the opposite end thereof to generally T-shaped switch 33 adapted for contact with switch contacts 34 and operated by pneumatic means in the form of an annular resilient rubber diaphragm 36 mounted in lower chamber 38. Immediately below lower chamber 38, body member 20 is provided with spider 40 having axial passage 41 therethrough and which supports plunger contact 42. Diaphragm 36 may be described as being a movable means mounted for movement in the port means and connected to contact switch 33 for closing the switch when the tire pressure decreases below the predetermined level. Diaphragm 36 is in fluid pressure contact with the interior of the tire by virtue of plunger contact 42 depressing valve core plunger 44.

Plunger contact 42 is adapted to contact and depress valve core plunger 44 when the transmitter is mounted on valve stem 21 in the manner shown in FIG. 2. By this arrangement, transmitter 13 is provided with port means which communicate with the interior of the tire through valve stem 21 in this instance.

Radio transmitting means are provided in the form of a radio transmitter utilizing a transistorized electrical circuit, or preferably an integrated circuit, the latter of which is particularly desirable because of its small size and compactness. Such a tranmitter is shown by the numeral 50 which may be a silicone tube having the radio circuit embedded therein, and is connected by leads 46 and 48 to battery 25. The electrical circuit is completed when switch 33 closes with contacts 34. Transmitter 50 is connected to an appropriate antenna which may be in the form of a spiral wire coil 51 mounted about body member 20. It is to be understood that the term "mounted about" is intended to be broad enough to cover an arrangement of an antenna which is on the surface of body member 20 or embedded slightly under the surface thereof.

In operation the transmitter would be mounted as shown in FIG. 2, after the tire had been inflated to the desired pressure level. Plunger contact 42 would depress valve core plunger 44 which thereby permits the application of the pressure in the tire through passages 41, whereby the pneumatic pressure would then be applied against diaphragm 36 to thereby move it to the right as shown in FIG. 2. Movement to the right would be restricted by the force of compression spring 30 which would normally tend to bias switch 33 to the closed position. Compression spring 30 would be selected to exert a force sufficient to close switch 33 with contacts 34 when the pressure in the tire fell below the pre-selected level. Alternatively, compression spring 30 might be made adjustable by varying the compression thereon by varying the amount which body plug 26 is screwed into body member 20. In any event, upon closing of the electrical circuit by contact switch 30 with contacts 34, a voltage from battery 25 is applied to transmitter 50 which then produces a radio signal output through antenna coil 51. This radio signal would then be picked up by one of the receiving antennas 16 and transmitted to receiving set 17 in the cab of the vehicle. It is to be understood that receiver 17 could be arranged with a signal device for each of the four tires or one for all tires on the vehicle, in which event the vehicle operator would be required to stop his vehicle and inspect for which tire was below the pre-selected level.

Referring now to FIGS. 3 and 4, the body member of the transmitter as shown therein is generally integral with the valve stem of the tire and is generally shown by the numeral 55. This is the type of valve stem which might be used with a tubeless tire, for example, and is comprised of valve stem 56 having axial bore 60 therethrough with valve core plunger 62 mounted therein to resiliently seal bore 60. Cap 57 is threadably mounted over the end of stem 56 as shown. Valve stem 56 is connected at its lower end or the left end as viewed in FIG. 4 to a generally disc shaped portion 58 made of hard rubber which is designed to fit inside of tire rim 59 and to thereby support valve stem 56. Portion 58 has a generally transversely extending port means communicating with the interior of the tire in the form of a generally cylindrical aperture 61 which extends from the center of valve stem 56 radially outward through portion 58 as shown.

Aperture 61 has mounted therein a movable piston 63 connected to a T-shaped switch 65 which is adapted to close with contacts 66. The lower end of switch 65 as viewed in FIG. 3 is connected to spring bias means in the form of compression spring 67 which normally urges switch 65 to close with contacts 66. Compression spring 67 is held in place by a plug screw 69, whereby the compression forces on spring 67 can be adjusted by the extent to which plug screw 69 is threaded into aperture 61.

Body portion 58 also has an electrical power source mounted therein in the form of either oscillators or batteries 73, which are adapted to provide an appropriate electrical power source such as three volts or what ever voltage is required to operate the radio transmitter.

Contacts 66 are connected at one side to lead 77 which leads to an appropriate radio transmitter means 78, which may be of the transistorized type or may include an integrated circuit as described above in connection with the first embodiment.

The other contact 66 is also connected to transmitter 78 through lead 79 which is also connected to batteries 73. Hence, upon closing of switch 65 with contacts 66, the electrical circuit is completed and transmitter 78 transmits radio signals via lead 81 to a metal ring shaped antenna 85 mounted about the outside of valve stem 56. Optionally or alternatively, the apparatus may be provided with a helical antenna 75 secured as by glue to the bottom of portion 58 and connected to transmitter 78 as shown in FIG. 3.

In operation, body 55 would be mounted inside the tire rim 59, as shown in FIG. 3. The tire could then be inflated by removal of cap 57 with air pressure applied down through bore 60 until the tire was inflated to the desired pressure level. It is to be understood that prior to insertion of the body 55 in the tire, plug screw 69 would be threaded into aperture 61 the desired distance such that the appropriate force is exerted on compression spring 67. The compression placed on spring 67 is selected so that it will not cause the closing of switch 65 with contacts 66 until the pressure inside the tire is reduced below a predetermined level. Switch 65 is normally held open by air pressure on the face of piston 63.

It is to be understood that aperture 61 may also communicate with bleed port 87 communicating with the outside of the tire, which thereby permits free movement of piston 63 in response to changes in tire pressure.

In the event that tire pressure should decrease to the point that spring 67 causes switch 65 to close with contacts 66, then the electrical circuit is complete and electrical voltage is supplied to transmitter 78, which produces radio output signals through antenna 85 or antenna 75 which can be picked up by the receiving set of the type shown in FIG. 1.

The embodiment shown in FIGS. 3 and 4 is particularly useful in that the transmitter is integral with the valve stem and renders it very difficult for unauthorized removal from the tire on which it is mounted.

Referring now to FIGS. 5 and 6, an alternate embodiment of the invention is shown which is adaptable for attaching to the inside end of a valve stem of the type which is used with tubeless tires. Body member wafer 92 is generally ring shaped and is adapted for attaching to the inside end of valve stem 89 by means of a plurality of dart members or prongs 95 which are attached at one end to body 92 with the arrow ends embedded in and attached to the base end of valve stem 89.

Valve stem 89 is shown mounted in tire rim 90 and is provided with axial bore 90, and is of standard construction. Body 92 has an axial opening 88 therethrough which is aligned with bore 90.

Body 92 has mounted therein valve means and radio transmitter means similar to that shown in FIGS. 3 and 4. In other words body 92 has radio transmitter 93 operated by battery 94, connected through switch 96 which is biased toward the closing position by spring 97. Switch 96 is attached to pison 98, the radially inward end of which communicates with opening 88, and hence the interior of the tire. Additional body has coiled antenna 99 glued thereto and connected to transmitter 93 by appropriate leads.

In operation, switch 96 is set to close in response to a decrease in pressure in the tire by adjusting the pressure on spring 97. When tire pressure decreases such that spring 97 closes switch 96, a radio signal is transmitted by antenna 99, which signal can be picked up by receiver means of the type described in connection with FIG. 1.

It will be observed that the invention herein described provides a low pressure tire transmitter which utilizes a novel antenna arrangement which generally surrounds the valve stem. The pneumatic switch arrangement of this invention is of simple construction, easy to adjust to the desired pressure level and is subject to little malfunctioning. Two of the embodiments shown herein are adapted for insertion inside of the tire body and, hence, are less susceptible to unauthorized tampering with or shift. In none of the embodiments does the transmitter interfere with the normal operation of the tire valve stem. The transmitter works automatically and does not require the use of a manual switch. It is to be understood that either a battery or an oscillator may be used as the electrical power source, although an oscillator is the preferred form in the second and third embodiments and a battery is the preferred form in the first embodiment as described above. The trigger means which actuates the transmitting device in no way obstructs the normal tire valve operation. Certain of the embodiments of the invention may use the so-called integrated circuits which may be incorporated in a silicone chip to further reduce the size and increase the compactness of the unit. Because of the compactness of the unit, it does not cause the tire to be unbalanced to any undesirable degree.

Further modifications may be made in the invention as particularly described without departing from the scope of the invention. Accordingly, the foregoing description is to be constructed as illustratively only and is not to be construed as a limitation upon the invention as defined in the following claims.

What is claimed is:

1. A tire pressure monitoring apparatus for a vehicle comprising a radio transmitter and a power source therefor mounted inside a fluid pressurized tire, an antenna secured to the transmitter for broadcasting a signal, a fluid pressure responsive switch responsive to a preselected fluid pressure for turning on the transmitter, a receiving antenna secured to the vehicle adjacent the path of rotation of the transmitter antenna for receiving said broadcast signal, and a radio receiver mounted in the vehicle connected to the receiving antenna.

2. An apparatus as defined in claim 1 wherein said radio transmitter, power source, and switch are encapsulated in a wafer.

3. An apparatus as defined in claim 2 wherein said transmitting antenna is secured to the wafer.

4. A tire pressure monitoring device comprising a wafer with a radio transmitter, a power source therefor, and a pressure responsive switch means embedded in said wafer, said switch means being responsive to a preselected pressure for supplying power from said source to said transmitter, a transmitting antenna for broadcasting a signal connected to said transmitter, and means accessible through the said wafer for adjusting said pressure responsive switch to select said preselected tire pressure.

References Cited

UNITED STATES PATENTS

| | | | |
|---|---|---|---|
| 3,111,644 | 11/1963 | Froelich et al. | 340—58 |
| 3,238,500 | 3/1966 | McElroy et al. | 340—58 |
| 3,281,784 | 10/1966 | Farthing | 340—58 |
| 3,329,934 | 7/1967 | Wooden | 340—58 |
| 2,727,221 | 12/1955 | Sprigg | 340—58 |
| 2,860,321 | 11/1958 | Strickland et al. | 340—58 |
| 2,966,658 | 12/1960 | O'Neill | 340—58 |
| 3,016,515 | 1/1962 | Summers et al. | 340—58 |
| 3,178,686 | 4/1965 | Mills | 340—58 |
| 3,223,969 | 12/1965 | Course | 340—58 |

THOMAS B. HABECKER, Primary Examiner

H. S. COHEN, Assistant Examiner

U.S. Cl. X.R.
325—117; 340—224